United States Patent [19]

Shirn et al.

[11] 4,127,680
[45] Nov. 28, 1978

[54] MAKING A CAPACITOR EMPLOYING A TEMPORARY SOLID MASK IN THE POROUS ANODE

[75] Inventors: George A. Shirn; Sidney D. Ross, both of Williamstown, Mass.

[73] Assignee: Sprague Electric Company, North Adams, Mass.

[21] Appl. No.: 765,175

[22] Filed: Feb. 3, 1977

[51] Int. Cl.² .......................... H01G 9/05; B05D 1/32
[52] U.S. Cl. ........................................ 427/80; 427/79; 427/226; 427/259; 427/261; 427/346; 427/430 R; 427/435
[58] Field of Search .................. 427/79, 80, 259, 226, 427/430 R, 435, 443, 57, 261, 346; 361/433

[56] References Cited

U.S. PATENT DOCUMENTS

| | | | |
|---|---|---|---|
| 3,438,809 | 4/1969 | Kaueggia et al. | 427/443 |
| 3,817,782 | 6/1974 | Klein et al. | 427/79 |
| 3,823,347 | 7/1974 | Karlik | 361/433 |
| 3,948,706 | 4/1976 | Schmeckenbecher | 427/259 |
| 3,967,000 | 6/1976 | Klein et al. | 427/80 |
| 4,022,928 | 5/1977 | Piwcyzk | 427/259 |
| 4,042,420 | 8/1977 | Nishino et al. | 427/80 |

*Primary Examiner*—Michael F. Esposito
*Attorney, Agent, or Firm*—Connolly and Hutz

[57] ABSTRACT

Formed porous tantalum pellets each having an extending anode wire are lowered part way into a molten compound such as napthalene. The napthalene wicks its way into substantially all of the pellet pores. Upon removal from the bath the napthalene freezes within each pellet. A liquid insulating material is applied to the anode wire while being masked from entering the porous pellet by the napthalene. The napthalene is subsequently vaporized from the pores and thereafter manganous nitrate is introduced into the pellet and is pyrolyzed to form $MnO_2$.

9 Claims, 6 Drawing Figures

MAKING A CAPACITOR EMPLOYING A TEMPORARY SOLID MASK IN THE POROUS ANODE

BACKGROUND OF THE INVENTION

This invention relates to a method for making a solid electrolyte capacitor and more particularly to such a method that includes forming a temporary solid mask in the porous capacitor anode.

Solid electrolyte capacitors are made by compressing a valve metal powder, usually tantalum, and sintering to produce a porous pellet. An anode riser wire is attached to the pellet. A dielectric film consisting of the valve metal oxide is formed over the surfaces of the porous pellet, usually by an electrochemical forming step. A solid electrolyte is then produced over the dielectric oxide film; this being accomplished in most instances by holding the pellet by the anode wire, dipping it briefly into a solution of manganous salt and pyrolyzing at a temperature from about 280° to 400° C to convert the salt in situ to manganese dioxide. Finally, a counterelectrode layer is deposited over the semiconductive manganese dioxide to serve as the cathode connecting means for the capacitor.

It is important in the above process to assure that the manganese dioxide solid electrolyte does not contact the extending anode wire which would lead to a shorted capacitor or at best would lead to abnormally high leakage currents.

It is known to apply an insulative coating, e.g. of polytetrafluoroethylene or of an epoxy resin, to the anode wire to prevent contact of the manganous salt to the wire. The coating must be applied either with great care or by masking to prevent the inadvertant introduction of the insulative material into the pores of the pellet which leads to a reduction of the electrical capacity and degradation of the fragile dielectric film in regions of the pellet that are adjacent to the anode wire. The latter often leads to high dissipation factors and increased leakage currents. Known liquid masking materials for this purpose are easily displaced during handling and during application of the insulative coating and consequently do not provide a reliable masking means.

It is therefore an object of this invention to provide a reliable pellet masking procedure in a method for making an electrolytic capacitor.

It is a further object of this invention to provide a relatively non critical low cost method for manufacturing solid electrolyte capacitors with high yields.

SUMMARY OF THE INVENTION

A method for making a solid electrolyte capacitor comprises attaching to a porous valve metal pellet an extending anode wire and forming a dielectric film over the surfaces of the porous pellet. The pores of the pellet are impregnated with a molten masking compound. An insulative coating is applied to the anode wire while the temperature and atmospheric pressure are established at which the masking material is a solid. The solid masking compound serves to prevent the insulative coating material from contacting and being drawn into the pores of the pellet. The solid masking compound is then removed from the pellet by vaporizing. The term vaporizing as used herein is intended to mean driving off as a gas, as for example by raising the temperature or reducing the atmospheric pressure to produce sublimation or boiling or chemical decomposition into gaseous by-products.

The insulative coating may be applied in a liquid form to the anode and subsequently dried or cured into a solid coating. The drying or curing may be accomplished simultaneously with the vaporizing of the masking compound.

A manganous salt solution is introduced into the pores of the pellet and is pyrolyzed and converted in situ to manganese dioxide. The insulative coating prevents contact of the manganese dioxide with the anode wire during these latter two steps. A counterelectrode layer is deposited over the manganese dioxide.

The solid mask of this invention is less subject to disruption and loss of masking effectiveness than are liquid masks. Furthermore, the solid mask which also fills the pellet pores provides an extra measure of safety and reliability in that no extraneous material will be admitted to the filled pores through discontinuities that may exist in the outer sealing film portion of the mask.

Many critical aspects of previously known methods are eliminated by the method of this invention. The masking step itself requires merely a partial immersion of the pellets in molten masking compound to achieve a self filling and self adjusting conformal masking shell over each pellet. The application of the insulative material to the anode wire may be accomplished by any of numerous noncritical batch means such as dipping, spraying and brushing. The depth of dipping of the pellets in manganous nitrate is not critical. The bulk application of these three materials may be easily and quickly achieved even for pellets that have a considerable variation in pellet dimensions and variation in the distance between each pellet and a bar from which they may be suspended for such bulk processing.

DESCRIPTION OF THE PREFERRED EMBODIMENTS

Figure 1:
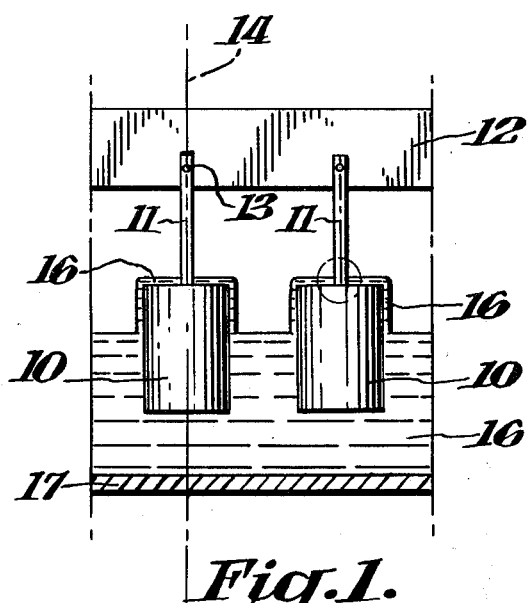
FIG. 1 shows two porous pellets partially submersed in a molten masking compound representing a step in the process of this invention. The cylindrical anodes and anode wires are shown in full side view while the compound is shown in cross section taken in a plane that includes the axes of the pellets and wires.

A first group of 30 porous tantalum pellets 10, each having a tantalum anode riser wire 11 extending from one end were regularly spaced and suspended from a metal carrier bar 12 by welds 13, as illustrated in FIG. 1. The anode wire 11 and the corresponding cylindrical pellet have a common axis 14. The pellets were made by compressing tantalum powder about an end of a tantalum wire and sintering the assembly. The anode wires may alternatively be attached to sintered pellets by welding.

Figure 2:
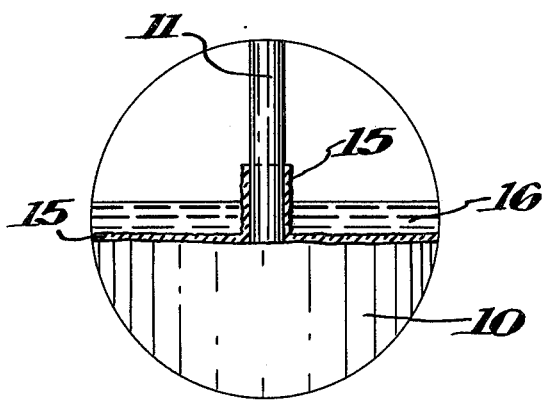
FIG. 2 shows enlarged a detail of the region of a pellet of FIG. 1 wherefrom the corresponding anode wire extends.

The pellets were submersed into a liquid electrolyte and a voltage was applied between the bar 12 and a counterelectrode that was also submersed in the electrolyte, to form a dielectric oxide film 15 over all surfaces of each porous pellet 10. The film 15 typically has a thickness of only a few thousand angstroms, but is shown disproportionally large in the detail of FIG. 2. The film 15 extends at least part way up the anode wire 11.

The pellets suspended by the bar 12 were then lowered into molten napthalene 16 that was heated to about 100° C, so that roughly the lower two thirds of each pellet was submersed therein. This step is illustrated in FIG. 1. The napthalene 16 is a clear liquid, and it was initially noted that the submersed portions of the pellets turned white, indicating a freezing of the napthalene in this region. A few seconds thereafter, as the pellets rose in temperature, a ring of the white frozen napthalene was seen to fall to the bottom of the tank 17 from each pellet and the upper portions of the pellet turned darker as the molten napthalene impregnated the porous pellet and wet the outer and upper surface portions of the pellet.

Figure 3:
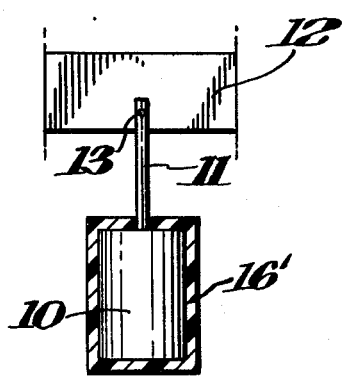
FIG. 3 illustrates a pellet of FIG. 1 being impregnated and encompassed by the solidified masking compound.

The pellets were removed from the molten napthalene and allowed to return to room temperature, about 25° C, whereupon the entire pellet appeared white. Such an impregnated pellet is illustrated in FIG. 3, having a mask of solid napthalene 16' thereabout as well as internal to the pores (not shown).

Figure 4:
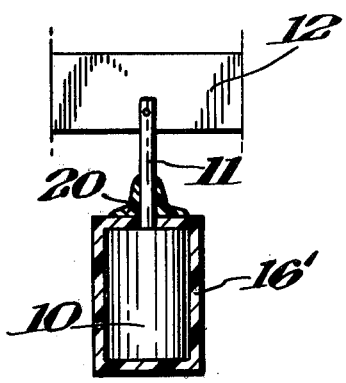
FIG. 4 illustrates in cross section an insulating coating having been applied to the anode wire of the pellet in FIG. 3.
Figure 5:
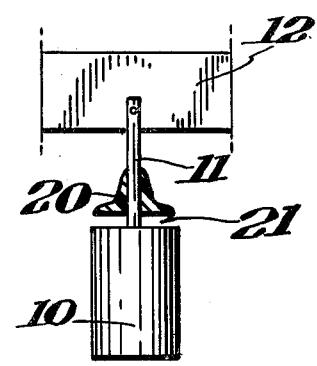
FIG. 5 shows the pellet of FIG. 4 after the solid masking compound has been vaporized.
Figure 6:
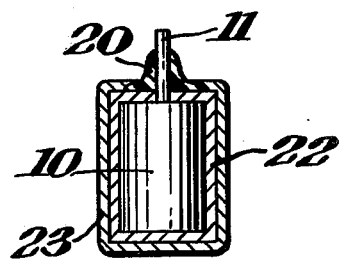
FIG. 6 shows the pellet of FIG. 5 with the addition of a solid electrolyte layer and a counterelectrode layer in cross section.

A small quantity of a dispersion of polytetrafluoroethylene (P.T.F.E.) particles in water was applied to the stem of the anode wire as illustrated in FIG. 4. Other highly fluorinated polymer particles may be dispersed in water and substituted for the P.T.F.E. dispersion. The assembly was heated to 180° C for about 15 minutes to drive off the water and form a solid P.T.F.E. insulative coating 20 on the portion of the anode wire near the pellet. Also in this heating step the napthalene mask was vaporized and completely removed from the inner and outer regions of the pellet, to produce pellets having insulated anode wires as illustrated in FIG. 5.

In subsequent conventional steps, the pellets were immersed in a dilute solution of manganous nitrate and were removed and heated in steam to about 300° C to pyrolyze and convert the nitrate to a layer of manganese dioxide ($MnO_2$). This was repeated several times to fill the pores with $MnO_2$ and to provide an outer shell of $MnO_2$ about the pellet. A counterelectrode 23 consisting of a first layer of graphite and an outer layer of silver was then deposited over the $MnO_2$ that serves as the solid electrolyte 22.

In the above described process, the P.T.F.E. dispersion also flowed over the solid napthalene mask and when dried formed an insulative coating 20 that was spaced from the adjacent region of the pellet by about 0.1 mm. When the napthalene was subsequently vaporized and removed, the coating 20 had an umbrella-like profile as indicated in FIG. 5. The space 21 provides exposure of the top as well as of the remainder of the pellet to the manganous nitrate solution. This advantageously leads to a complete filling of the pores from all pellet sides, with equivalent efficacy to that achievable with no insulative coating on the anode wire at all.

It is important in carrying out the above process to remove essentially all of the solid masking material from the pores. Small residual amounts will prevent contact of the $MnO_2$ to some surfaces of the dielectric film and result in a reduction of electrical capacity, a higher equivalent series resistance and a higher dissipation factor (DF). Inadvertant admission of the insulative wire coating material into some of the pores will produce a similar effect. However, the uniformity of capacitance and DF from unit to unit of capacitors made according to the relatively care-free method of this invention is as good or better than for capacitors made by a similar method employing no masking and including the application of minute controlled amounts of the insulative material with great care, e.g. application by tweezers to the anode wire while viewing under optical magnification.

An alternative means of applying the insulative material to the anode wire consists in dipping the masked anode completely and including a short portion of the extending anode wire into a bath of the insulative liquid. After withdrawal and after drying or curing the insulative material to solidify it, the units are heated to vaporize the napthalene and the P.T.F.E. material was found to flake off easily from the sides and bottom of the pellets leaving the lower anode wire portion with a small insulative umbrella-like coating as before. Removal of these flakes may be facilitated by various means such as holding the pellets in a stream or in an agitated bath of water. Subjecting the pellets to a blast of air is also effective. This dipping means of applying the insulative material requires a minimum of care and of labor, further simplifying the manufacturing method and reducing costs.

In a second example of the method of this invention the same steps were employed as described in the example given above, but the masking compound was asymmetric tetrachlorodifluoroethane ($CCl_3CF_2Cl$). A molten bath of this compound was held at about 60° C. for the dip masking step, which temperature was established to be a modest 20° C. above the melting point so as to provide a low viscosity and effective capillarity and dispersion wicking within the pellet pores while avoiding high rates of loss by evaporation from the bath. Since this compound is highly volatile at room temperature it was found that a speedy application of the insulative coating on the anode wire before initiating the drying step was required, this period having to be less than about 15 seconds. This would only be practical in large scale production if these steps were fully automated.

The basic requirements of the masking compound are that it be capable of complete removal by vaporization and that it vaporize at temperatures less than about 250° C. so as to avoid exposing the fragile dielectric film to additional high temperature cycles. Preferably it will also be immiscible with the liquid or uncured phase of the anode wire insulative material. This latter property may not be necessary if the rate of dissolution of the two materials is low enough that the masking remains effective in the time necessary between applying the insulative material and curing or drying it. Even water and other low melting compounds may be used as the masking compound if it is frozen at the time the insulative material is applied. Some masking compounds that are solid at room temperature and are therefore most conveniently used are listed along with their melting points (m.p.) and boiling points (b.p.) in Table I. All of these materials are water immiscible.

Table I

| MASK | m.p. (° C) | b.p. (° C) |
|---|---|---|
| Napthalene | 80 | 218 |
| d-Camphor (C$_{10}$H$_{16}$O) | 178 | sublimes |
| P-Dichlorobenzene | 53 | 173 |
| CCl$_3$CF$_2$Cl* | 40 | 92 |

*Freon 112A made by E.I. DuPont

In a third example, the same steps as in the first described example were employed with the following exceptions. The masking compound was ammonium formate held as a dipping bath at 140° C. The insulative material is a silicone dissolved in xylene called Metacote by the supplier, the Mereco Products Company, Cranston, Rhode Island. The varnish material was cured to a hard shiny mass at 150° C. for 15 minutes during which the ammonium formate was decomposed and evaporated. The vapor pressure of ammonium formate is quite high at this temperature and complete vaporization was achieved well within the 15 minutes.

Although the electrical properties of these capacitors were not as good as those of the first example, it again appears that adjustments in the process of this example will lead to high quality capacitors while still providing the reduction in the necessary care and cost of manufacturing as was realized by the process described in the first example above.

Masking materials listed in Table II that are solid at room temperature are especially suitable for use in the method of this invention. They are also immiscible in xylene and many other aromatic hydrocarbon solvents.

Table II

| MASK | m.p. (° C) | b.p. (° C) |
|---|---|---|
| Trioxy methylene | 64 | 180 sublimes |
| Ammonium formate | 116 | 180 decompses |
| Ammonium acetate | 114 | decomposes |
| Ammonium thiocyanate | 150 | 170 decomposes |

It should be noted that the water immiscible compounds listed in Table I are miscible in xylene and are generally unsuitable for use with the slicone-xylene coating material of the third example. Likewise the xylene — immiscible compounds listed in Table II are miscible in water and generally are unsuitable for use with the water dispersed coating material of the first and second examples.

There are undoubtedly many other compounds that may be effectively used for the solid mask in the method of this invention. Of those tried, napthalene has provided the most effective mask. It was found that the shiny silicone varnish of the third example absolutely repelled and prevented adherence and capillarity of the manganous nitrate, whereas in comparison the insulative material of the first example consisting in P.T.F.E. particles was slightly wettable by manganous nitrate. It is believed that a silicon or other high temperature varnish may be dispersed in a water vehicle for effective use as the wire insulative material and used in conjunction with the water immiscible napthalene mask. Such a combination would be expected to provide uniformly high quality capacitors at a minimum cost. It is preferred that the masking compound have a melting temperature at least as high as 30° C. to insure its remaining solid over a wide range of ambients that may be found in manufacturing areas, which desirable property the listed compounds exhibit.

What is claimed is:

1. A method for making a solid electrolyte capacitor having a porous valve metal pellet with a lead wire extending from one surface thereof comprising
    (a) forming a dielectric film over the surfaces of said porous valve metal pellet;
    (b) applying a sealing film over at least said one surface and into the pores of said pellet with a molten masking compound selected from naphthalene, camphor, p-dichlorobenzene, and CCl$_3$CF$_2$Cl;
    (c) applying an insulative coating in a water-dispersed form to said wire while providing a temperature and atmospheric pressure at which said masking compound is solid;
    (d) solidifying said coating; and vaporizing said solid masking compound from said one surface so that a space is formed between and completely separates said solidified insulative coating and said pellet.

2. The method of claim 1 wherein said applying a sealing film is accomplished by immersing into said molten masking compound only a portion of said pellet which portion is opposite to said one surface.

3. The method of claim 2 wherein said applying a sealing film is effected in said one surface by capillarity.

4. The method of claim 1 wherein the melting temperature of said masking compound at one atmosphere is at least 30° C. and wherein said applying of said insulative coating is accomplished in an ambient of about 23° C. at one atmosphere.

5. The method of claim 1 wherein said liquid form of said insulative coating consists of highly fluorinated polymer particles dispersed in water.

6. The method of claim 5 wherein said highly fluorinated polymer is polytetrafluoroethylene.

7. The method of claim 6 wherein said solidifying is accomplished simultaneously with said vaporizing by elevating the temperature above 23° C. and drying said coating.

8. The method of claim 1 wherein said application of said insulative coating is accomplished by submersing the whole of said pellet with said solid masking compound into said liquid insulative material.

9. The method of claim 8 additionally comprising, after said solidifying and said vaporizing, removing the excess insulative material by a mechanical agitating means.

* * * * *